(12) United States Patent
Sakai et al.

(10) Patent No.: US 7,864,028 B2
(45) Date of Patent: Jan. 4, 2011

(54) IN-VEHICLE EMERGENCY CALL APPARATUS

(75) Inventors: Hiroshi Sakai, Okazaki (JP); Seiji Maruo, Obu (JP)

(73) Assignee: Denso Corporation, Kariya (JP)

( * ) Notice: Subject to any disclaimer, the term of this patent is extended or adjusted under 35 U.S.C. 154(b) by 345 days.

(21) Appl. No.: 12/074,464

(22) Filed: Mar. 3, 2008

(65) Prior Publication Data
    US 2008/0218321 A1    Sep. 11, 2008

(30) Foreign Application Priority Data
    Mar. 6, 2007    (JP) ............................. 2007-055651

(51) Int. Cl.
    *B60Q 1/00*    (2006.01)
(52) U.S. Cl. .................. 340/425.5; 340/660; 340/661; 340/662; 340/663; 340/664; 701/45; 280/735; 307/10.1; 180/271
(58) Field of Classification Search ............. 340/425.5, 340/438, 660–664; 701/45; 280/802, 735; 307/10.1; 180/271
    See application file for complete search history.

(56) References Cited

U.S. PATENT DOCUMENTS

| | | | |
|---|---|---|---|
| 6,591,176 B1 * | 7/2003 | Perry et al. ................. | 701/45 |
| 6,721,553 B2 | 4/2004 | Yoshioka | |
| 7,034,705 B2 | 4/2006 | Yoshioka | |
| 7,088,225 B2 | 8/2006 | Yoshioka | |
| 2002/0177931 A1 | 11/2002 | Iwasaki et al. | |
| 2006/0071804 A1 * | 4/2006 | Yoshioka ................. | 340/636.1 |

FOREIGN PATENT DOCUMENTS

| | | |
|---|---|---|
| JP | 08-287386 | 11/1996 |
| JP | 2000-108822 | 4/2000 |
| JP | 2001-034872 | 2/2001 |
| JP | 2001-196998 | 7/2001 |
| JP | 2002-118685 | 4/2002 |
| JP | 2002-347541 | 12/2002 |
| JP | 2004-249772 | 9/2004 |

OTHER PUBLICATIONS

Office action dated Dec. 16, 2008 in Japanese Application No. 2007-055651.
Office action dated Dec. 11, 2009 in corresponding Chinese Application No. 2008 1008 2458.0.
Office action dated Jun. 26, 2009 in corresponding Chinese Application No. 2008 1008 2458.0.

* cited by examiner

*Primary Examiner*—George A Bugg
*Assistant Examiner*—Ojiako Nwugo
(74) *Attorney, Agent, or Firm*—Harness, Dickey & Pierce, PLC

(57) ABSTRACT

An in-vehicle emergency call apparatus capable of performing an emergency call operation when electric power supply from a vehicle battery is cut is provided. The in-vehicle emergency call apparatus includes a first electric power supply line system causing an electric power supply unit to supply electric power to an emergency notification detection unit and an control unit. A second electric power supply line system is provided that causes the electric power supply unit to supply the electric power to the radio-communication unit. The second electric power supply line system is provided independently of the first electric power supply line system. A first capacitor coupled with the first electric power supply line system is capable of being configured to have a small capacitance.

20 Claims, 6 Drawing Sheets

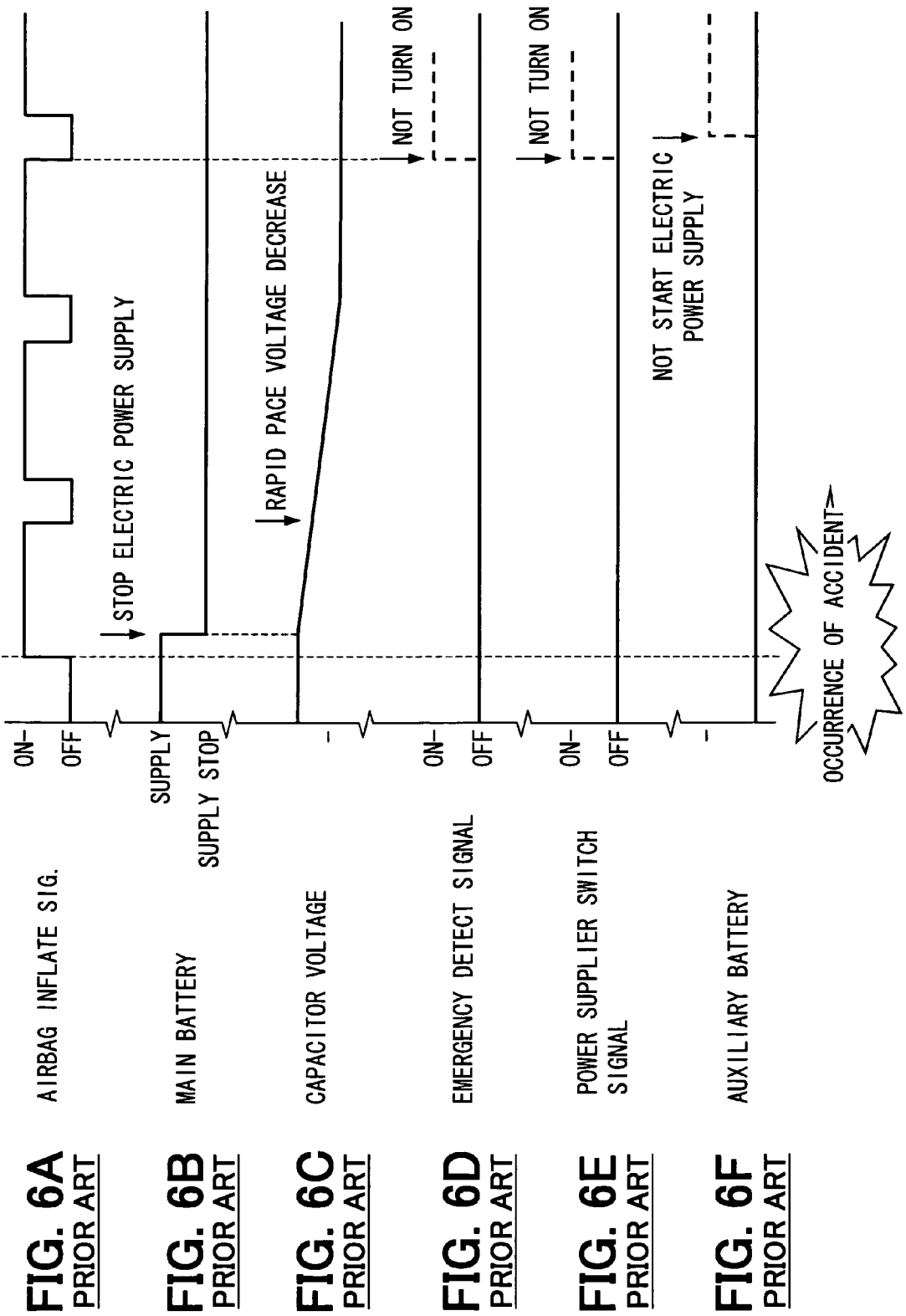

IN-VEHICLE EMERGENCY CALL APPARATUS

CROSS REFERENCE TO RELATED APPLICATION

The present application is based on and claims priority to Japanese Patent Application No. 2007-55651 filed on Mar. 6, 2007, the entire contents of which are incorporated herein by reference.

BACKGROUND OF THE INVENTION

1. Field of the Invention

The present invention relates to an in-vehicle emergency call apparatus that switches an operating power supply unit from a main battery in a vehicle to an auxiliary battery and transmits an emergency call signal to a service center when an emergency occurs.

2. Description of Related Art

An in-vehicle emergency call apparatus that switches an operating power supply unit from a main battery in a vehicle to an auxiliary battery and transmits an emergency call signal to a service center when, for example, an accident occurs is described in Japanese Patent No. 3700417.

FIG. 5 is a block diagram illustrating a schematic configuration of a conventional in-vehicle emergency call apparatus 1 like that disclosed in Japanese Patent No. 3700417. The in-vehicle emergency call apparatus 1 is described with reference to FIG. 5. When an occurrence of, for example, a vehicle accident causes airbag inflation signals to be input to an emergency notification detection unit 2 from an airbag electronic control unit (ECU) 3, the emergency notification detection unit 2 outputs a power supply switch signal to a power supply switch unit 4 and an emergency notification detection signal to a control unit 5. When the power supply switch signal is input to the power supply switch unit 4, a switch 4A is switched from OFF corresponding to a solid line in FIG. 5, to ON corresponding to a dashed line in FIG. 5. Then, the power supply switch unit 4 switches an operating power supply unit for supplying operating power from a main battery 6, which is installed in the vehicle, to an auxiliary battery 7. An electric power supply unit 8 supplies electric power from the auxiliary battery 7 as the operating power to the emergency notification detection unit 2, the control unit 5, and a radio-communication unit 9. When the control unit 5 receives the emergency notification detection signal from the emergency notification detection unit 2, the control unit 5 outputs an emergency call command signal to the radio-communication unit 9 and causes the radio-communication unit 9 to sent the emergency call signal to a service center through a wide area communication network.

In the above configuration, the electric power supply unit 8 is configured to supply the operating power to units such as the emergency notification detection unit 2, the control unit 5, and the radio-communication unit 9 through an electric power supply line system 11. If supplying electric power from the main battery 6 to the units is interrupted, the units are configured to operate on electric power supplied from a stored voltage of a capacitor 12, until the auxiliary battery 7 starts supplying electric power.

In the above configuration however, when the emergency notification detection unit 2 successively detects or receives multiple detection signals such as airbag inflation signals within a predetermined period, the emergency notification detection unit 2 outputs the power supply switch signal and the emergency notification detection signal to prevent a glitch in an emergency call operation. Further, since the radio-communication unit 9 consumes relatively more electric power as compared to the emergency notification detection unit 2 and the control unit 5, the capacitor 12 should have a large capacitance.

As shown in FIG. 6A to FIG. 6F, when the capacitor 12 rapidly discharges depleting the stored voltage before the emergency notification detection unit 2 receives the multiple airbag inflation signals in the predetermined period, the emergency notification detection unit 2 halts or otherwise becomes inoperative. In the above case, the emergency notification detection unit 2 cannot output the power supply switch signal and the emergency notification detection signal; thus, the operating power supply unit is not switched from the main battery 6 to the auxiliary battery 7, and the emergency call signal is not appropriately sent to a service center 10. Therefore, it is likely in some cases that an emergency call operation including switching an operating power supply unit for providing operating power and transmitting the emergency call signal is not appropriately carried out.

SUMMARY OF THE INVENTION

In view of the above-described problem, it is an object of the present invention to provide an in-vehicle emergency call apparatus which is capable of performing a emergency call operation including switching an operating power supply unit for providing operating power from a main battery in a vehicle to an auxiliary battery even when electric power supply from the main battery is interrupted and sending an emergency call signal to a service center.

According to an aspect of the present invention, an in-vehicle emergency call apparatus, which is coupled with an emergency notification ECU capable of outputting a detection signal indicative of an occurrence of an emergency, a radio-communication unit capable of transmitting an emergency call signal to a service center, and an operating power supply unit provided by a main battery and an auxiliary battery is provided. The operating power supply unit is capable of providing operating power with the in-vehicle emergency call apparatus. The in-vehicle emergency call apparatus includes an emergency notification detection unit that is configured to make a determination whether a condition for transmitting the emergency call signal is satisfied within a predetermined period such as from a time when the detection signal is input to the emergency notification detection unit from the emergency notification ECU. The in-vehicle emergency call apparatus is further configured to output a power supply switch signal and an emergency notification detection signal when the condition for transmitting the emergency call signal is determined to be satisfied. The in-vehicle emergency call apparatus further includes a control unit that is configured to cause the radio-communication unit to transmit the emergency call signal to the service center when the emergency notification detection signal is input to the control unit, and when an electric power condition associated with the radio-communication unit is satisfied. It should be noted that the electric power condition associated with the radio-communication unit is that the electric power is supplied from the electric power supply unit to the radio-communication unit.

The in-vehicle emergency call apparatus further includes a power supply switch unit that is configured to switch the operating power supply unit from the main battery to the auxiliary battery when the power supply switch signal is input to the power supply switch unit. An electric power supply unit can be included that is configured to supply electric power that is selectively supplied from one of the main battery and the auxiliary battery, to the emergency notification detection unit, the control unit, and the radio-communication unit. Further a first electric power supply line system can be included that causes the electric power supply unit to supply the electric power to the emergency notification detection unit and the control unit. A second electric power supply line system can be included that causes the electric power supply unit to supply the electric power to the radio-communication unit, the second electric power supply line system being provided independently of the first electric power supply line system. A first and second charging-discharging element can be included that are coupled respectively with the first and second electric power supply line system.

According to the above the in-vehicle emergency call apparatus, the first electric power supply line system that causes the electric power supply unit to supply the electric power to the emergency notification detection unit and the control unit is provided independently of the second power supply line system that causes the electric power supply unit to supply the electric power to the radio communication unit. Therefore, the first discharging charging element, which functions as a backup electric power supply element for backing up electric power supply, can be configured to have a small capacitance. When electric power supply from the vehicle battery is interrupted, the first discharging charging element causes the emergency notification detection unit and the control unit to ensure or maintain operations thereof. Therefore, the emergency notification detection unit is capable of appropriately outputting the power supply switch signal to the power supply switch unit and the emergency notification detection signal to the control unit. The power supply switch unit is capable of appropriately switching the operating power supply unit from the main battery to the auxiliary battery. The emergency call signal is capable of being appropriately transmitted to the service center. An emergency call operation is appropriately performed.

BRIEF DESCRIPTION OF THE DRAWINGS

The above and other objects, features and advantages of the present invention will become more apparent from the following detailed description made with reference to the accompanying drawings. In the drawings:

FIG. 6A-FIG. 6F are timing charts illustrating a timing of an operation associated with a prior art in-vehicle emergency call apparatus.

DETAILED DESCRIPTION OF THE EXEMPLARY EMBODIMENTS

Figure 1:
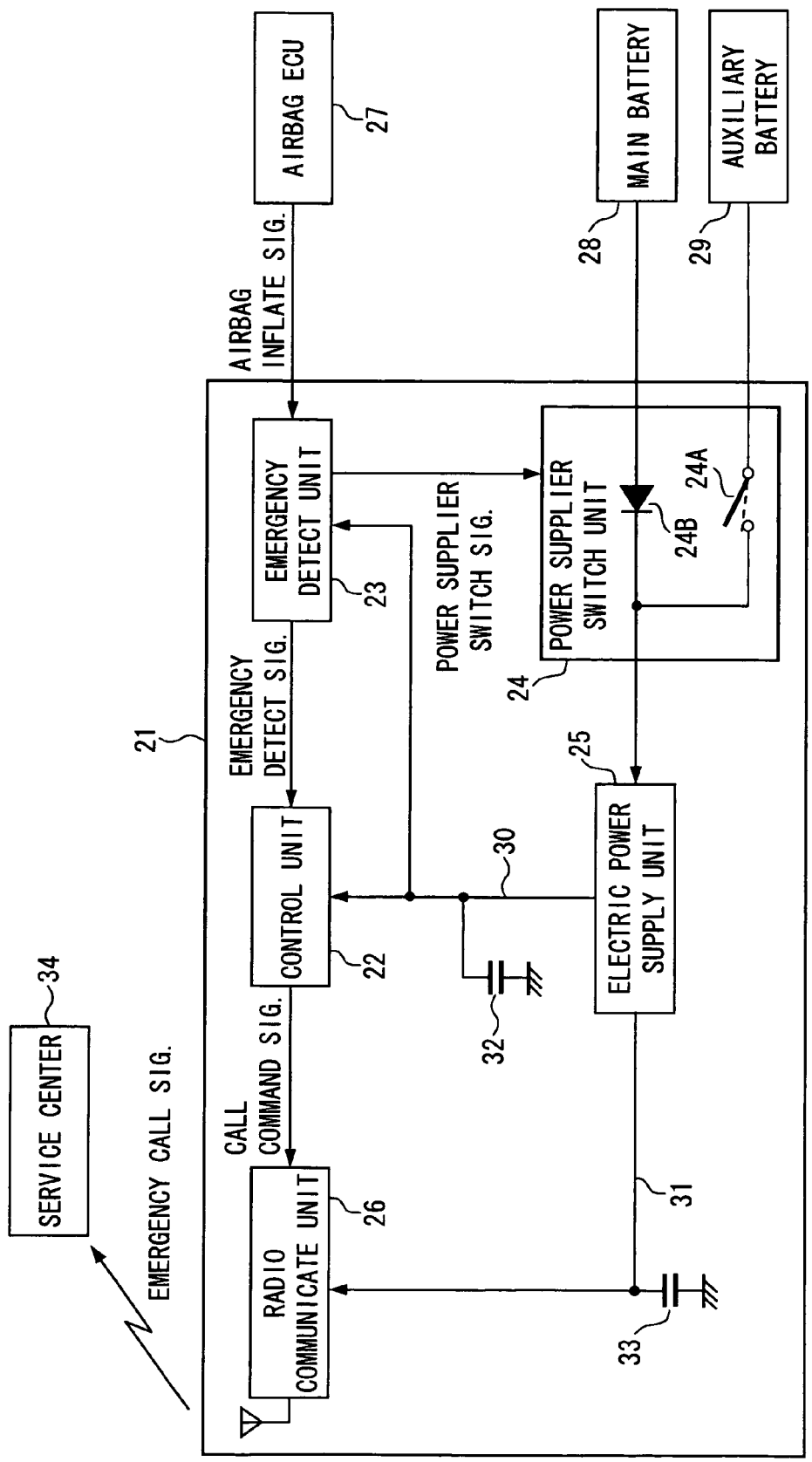
FIG. 1 is a block diagram illustrating a functional configuration of an in-vehicle emergency call apparatus according to an exemplary embodiment.

An in-vehicle emergency call apparatus 21 is described below with reference to FIG. 1 to FIG. 4F and includes a control unit 22, an emergency notification detection unit 23, a power supply switch unit 24, an electric power supply unit 25, and a radio-communication unit 26.

The control unit 22 includes a central processing unit (CPU) to control almost overall operations of the in-vehicle emergency call apparatus 21. The emergency notification detection unit 23 is coupled with an airbag electronic control unit (ECU) that commands an airbag to inflate. The airbag ECU is configured to output an airbag inflation signal, which indicates that the airbag is commanded to inflate, to the emergency notification detection unit 23 when, for example, an emergency such as an accident occurs. The airbag ECU may function as an emergency notification ECU which outputs a detection signal indicative of an occurrence of an emergency. The airbag inflation signal may function as the detection signal. When the airbag inflation signal is input to the emergency notification detection unit 23, corresponding to "YES" at S1, the emergency notification detection unit 23 makes a determination at S2 whether the airbag inflation signal is input three times in a row in a predetermined period, or, in other words, whether the emergency notification detection unit 23 detects three pulse signals. The detection of the inflation signals is in connection with a condition for causing emergency call transmission. The predetermined period may have a predetermined time span and may start from a time when the first airbag inflation signal is input. When the airbag inflation signal is input three times in a row in the predetermined period, the emergency notification detection unit 23 outputs a power supply switch signal to the power supply switch unit 24 and the emergency notification detection signal to the control unit 22.

The power supply switch unit 24 includes a switch 24A and a diode 24B. The switch 24A is maintained to be an OFF state in a normal case where the power supply switch signal is not input from the emergency notification detection unit 23. Further, in the normal case, electric power, which is supplied from a main battery 28 installed in a vehicle, is supplied to the electric power supply unit 25 through the diode 24B. When the power supply switch signal is input to the power supply switch unit 24, the switch 24A is switched from the OFF state corresponding to a dashed line in FIG. 1 to an ON state corresponding to a solid line in FIG. 1. As a result, an operating power supply unit for providing operating power is switched from the main battery 28 to an auxiliary battery 29; thereby, electric power from the auxiliary battery 29 is supplied to the electric power supply unit 25 via the switch 24A. The auxiliary battery 29 may be provided by a primary battery.

One electric power between that from the main battery 28 and the auxiliary battery 29 is selected to be supplied to the electric power supply unit 25. The electric power supply unit 25 supplies the selected one electric power as operating power to the emergency notification detection unit 23, the control unit 22, and the radio-communication unit 26. The electric power is supplied to the emergency notification detection unit 23, the control unit 22, and the radio-communication unit 26 through an electric power supply line system. The electric power supply line system includes a first electric power supply line system 30 and a second electric power supply line system 31. The first electric power supply line system 30 allows the electric power supply unit 25 to supply the electric power as the operating power to the emergency notification detection unit 23 and the control unit 22. The second electric power supply line system 31 allows the electric power supply unit 25 to supply the electric power as the operating power to the radio-communication unit 26. In the present embodiment, the first electric power supply line system 30 are provided independently of the second electric power supply line system 31 as shown in, for example, FIG. 1. The first electric power supply line system 30 is coupled with a first capacitor 32 as a first charging-discharging element. The second power supply line system 31 is coupled with a second capacitor 33 as a second charging-discharging element.

The first capacitor 32 functions as a back-up capacitor for backing up the electric power supply to the emergency notification detection unit 23 and the control unit 22. It is sufficient for the first capacitor 32 to have a small capacitance since the emergency notification detection unit 23 and the control unit 22 consumes a relatively smaller quantity of electric power than the radio-communication unit 26. The second capacitor 33 has a large capacitance and functions as a back-up capacitor for backing up the electric power supply to the radio-communication unit 26. The capacitance of the second capacitor 33 is larger than that of the first capacitor 32.

When the emergency notification detection signal is input to the control unit 22 from the emergency notification detection unit 23, the control unit 22 outputs the emergency call command signal to the radio-communication unit 26 and causes the radio-communication unit 26 to transmit the emergency call signal to the service center 34. In addition to the above units or the above functional blocks, the in-vehicle emergency call apparatus 21 may further include, for example, a timer unit for timing, a GPS positioning unit for acquiring positional information by calculating and processing a GPS signal, a display unit for displaying various informational items, a memory unit for storing various information items, a user operation detection unit for detecting user operations, a sound processing unit for processing speech input from an microphone and output to a speaker, and the like. The control unit 22 may store an identification-related information element, such as an identifier, used for identifying the in-vehicle emergency call apparatus 21 and the relevant vehicle positional information acquired based on positioning by GPS positioning unit. The control unit 22 may cause the radio-communication unit 26 to transmit the emergency call signal further including the identifier to the service center 34. Note that the airbag inflation signal is input from the airbag ECU 27 to the in-vehicle emergency call apparatus 21 when an ignition (IG) switch is an ON state.

Figure 2:
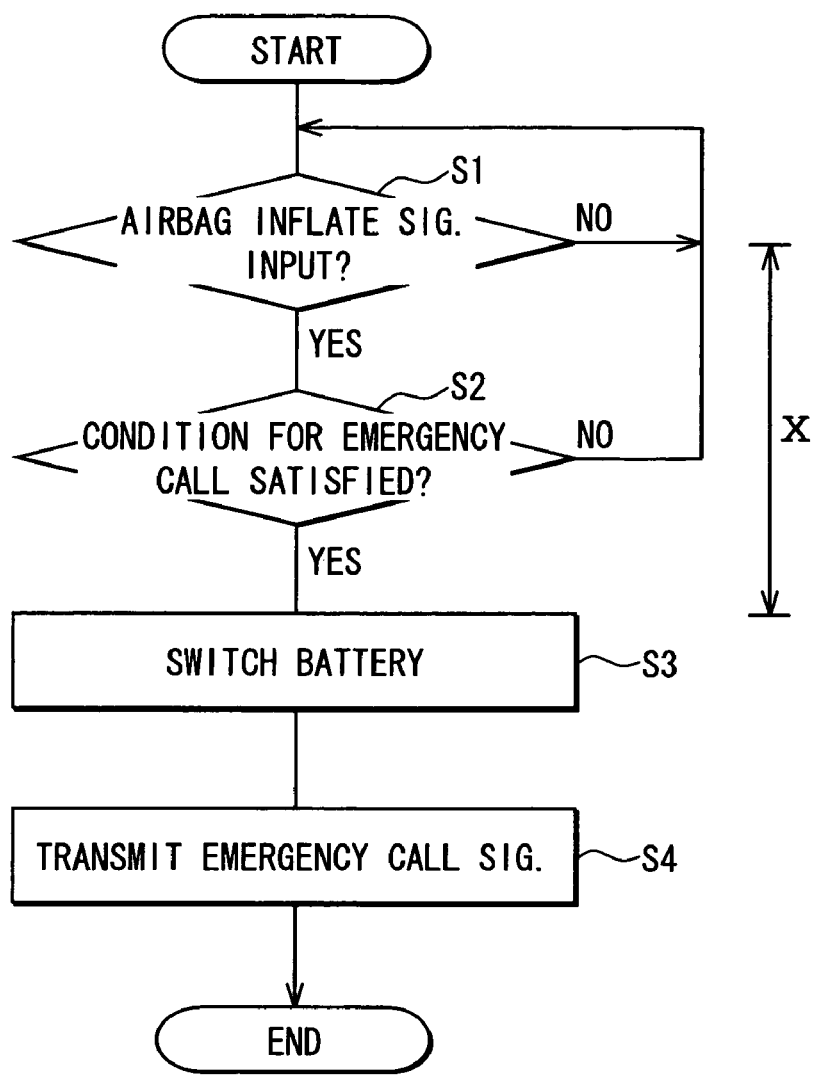
FIG. 2 is a flowchart illustrating an operation of the in-vehicle emergency call apparatus according to an exemplary embodiment.
Figure 3:
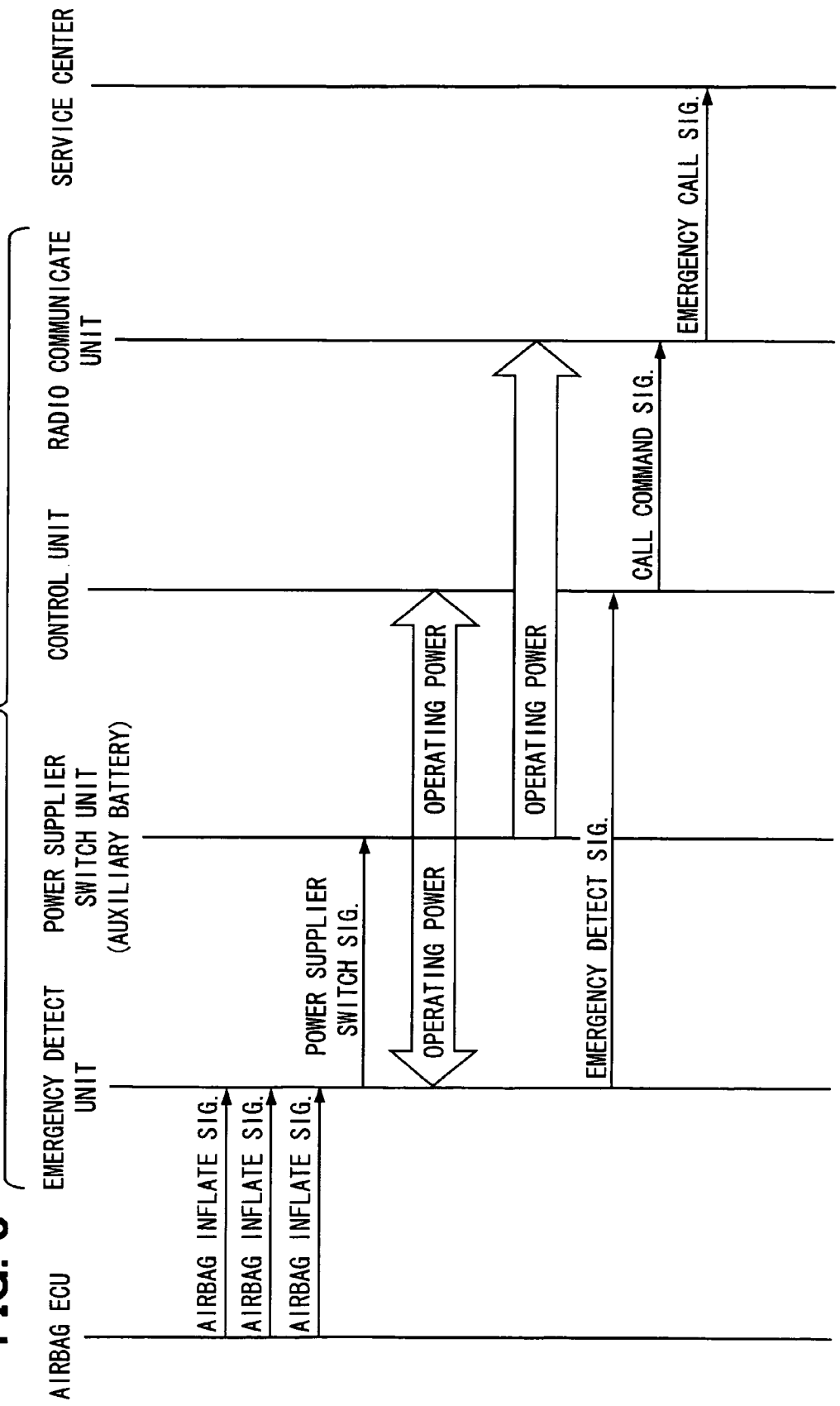
FIG. 3 is a message flow diagram illustrating a communication sequence associated with the in-vehicle emergency call apparatus according to an exemplary embodiment.
Figure 4:
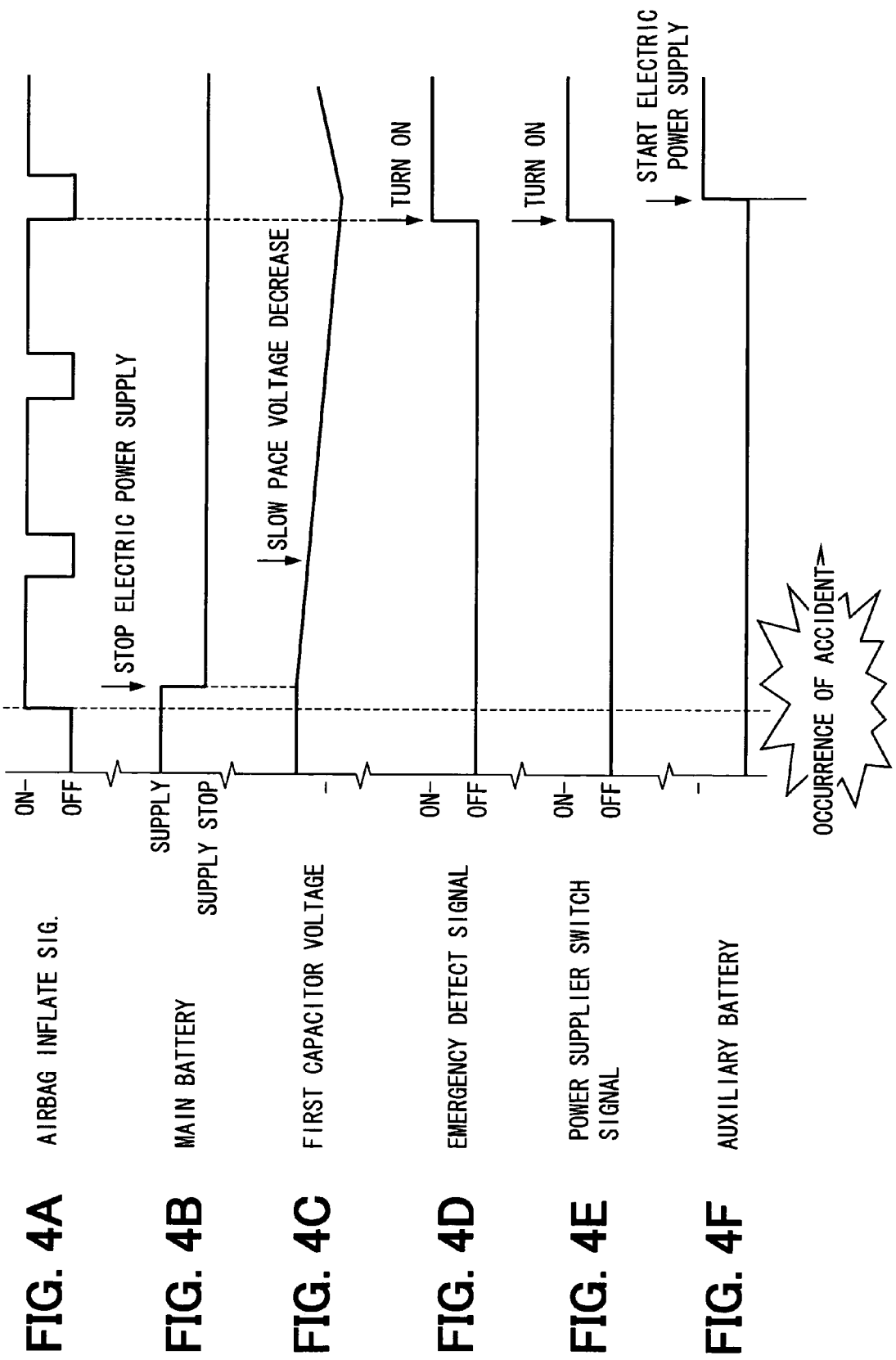
FIG. 4A-FIG. 4F are timing diagrams illustrating a timing of an operation associated with the in-vehicle emergency call apparatus according to an exemplary embodiment.
Figure 5:
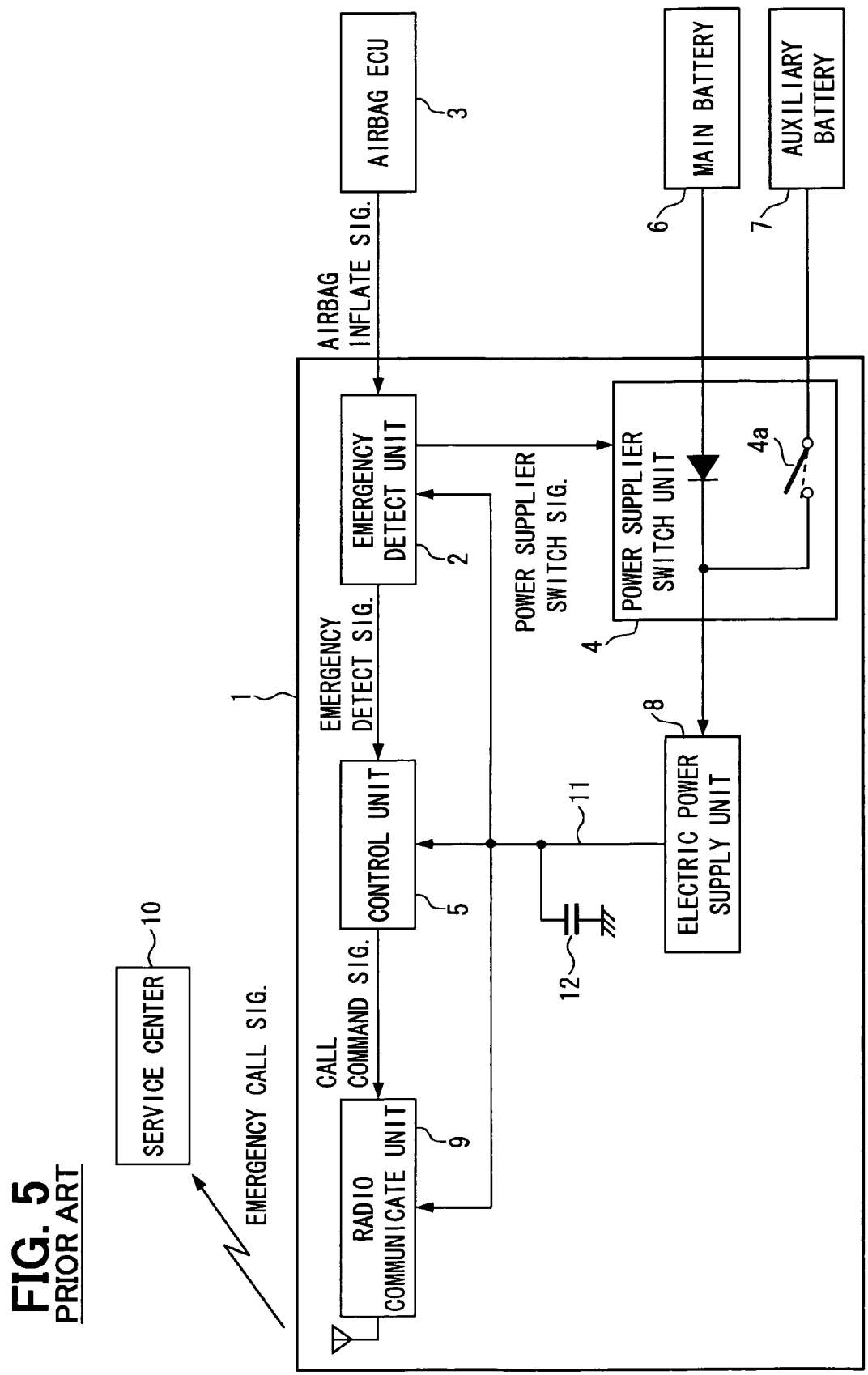
FIG. 5 is a block diagram illustrating a functional configuration of a prior art in-vehicle emergency call apparatus.

Functions of the in-vehicle emergency call apparatus 21 according to the present embodiment are described below with reference to FIG. 2 and FIG. 3. When an IG signal indicating that the IG switch is in the ON state is in an ON state, the emergency notification detection unit 23 monitors the input of the airbag inflation signal from the airbag ECU at S1. When the emergency notification detection unit 23 determines that the airbag inflation signal is input from the airbag ECU 27, corresponding to YES at S1, the emergency notification detection unit 23 make a determination at S2 whether three airbag inflation signals are successively input in the predetermine period in order to determine whether the condition for performing the emergency call is satisfied.

Here, suppose that an occurrence of a major accident results in cutting the electric power supply from the main battery 28. When the electric power supply from the main battery 28 is interrupted, until the auxiliary battery 29 supplies the electric power, the emergency notification detection unit 23 and the control unit 22 operates on the electric power originating from the stored voltage in the first capacitor 32, and the radio-communication unit 26 operates on the electric power originating from the stored voltage in the second capacitor 33. In the above case, unlike the conventional in-vehicle emergency call apparatus, the voltage of the first capacitor 32 does not decrease at a rapid pace but decreases at a slower pace as shown in FIG. 4A to FIG. 4F. The in-vehicle emergency call apparatus 21 according to the present embodiment includes the first capacitor 32 and the second capacitor 33. The first capacitor 32 functions as the back-up capacitor for backing up the electric power supply to the emergency notification detection unit 23 and the control unit 22. The second capacitor 33 functions as the back-up capacitor for backing up the electric power supply to the radio-communication unit 26. In the present embodiment, before three successive airbag inflation signals are successively input in the predetermined period, the voltage stored in the first capacitor 32 is configured to be not depleted, and as a result, the emergency notification detection unit 23 is configured not to halt and not to be inoperative. Symbol "X" in FIG. 2 shows a case where processes are operated on the stored voltage of the first capacitor 32 when the electric power supply from the main battery 28 is cut.

When the emergency notification detection unit 23 determines that the condition for performing the emergency call operation is satisfied, corresponding to YES at S2, the emergency notification detection unit 23 outputs the power supply switch signal to the power supply switch unit 24 and the emergency notification detection signal to the control unit 22.

When the power supply switch unit 24 receives the power supply switch signal from the emergency notification detection unit 23, the power supply switch unit 24 causes the switch 24A to turn from OFF to ON. As a result, the operating power supply unit is switched from the main battery 28 to the auxiliary battery 29 at S3. The auxiliary battery 29 supplies the electric power to the electric power supply unit. In the above case, the supply of the electric power from the auxiliary battery 29 to the power supply switch unit 24 leads to an increase in the voltage of the first capacitor 32, which causes the first capacitor to regain a normal voltage. The normal voltage may be defined as a voltage provided in a case where an emergency does not occur. When the control unit 22 receives the emergency notification detection signal from the emergency notification detection unit 23, the control unit 22 outputs the emergency call command signal to the radio-communication unit 26 and causes the radio-communication unit 26 to transmit the emergency call signal to the service center 34.

As described above, the in-vehicle emergency call apparatus 21 includes the first electric power supply line system 30 for causing the electric power supply unit supply the electric power to the emergency notification detection unit 23 and the control unit 22, the second electric power supply line system 31 for causing the electric power supply unit 25 to supply the electric power to the radio-communication unit 26, the second electric power supply line system 31 being provided independently of the first electric power supply line system 30. The first capacitor 32 is coupled with the first electric power supply line system 30 functions as the back up capacitor for backing up the electric power supply to the emergency notification detection unit 23 and the control unit 22. The second capacitor 33 is coupled with the second electric power supply line system 31 and functions as the back up capacitor for backing up the electric power supply to the radio communication unit 26. According to the above configuration, it is possible for the first capacitor to have a small capacitance. Moreover, when the electric power supply from the main battery 28 is interrupted, the first capacitor is capable of maintaining operations of the emergency notification detection unit 23 and the control unit 22 by a time the electric power is supplied from the auxiliary battery. As a result, the operating power supply unit is capable of being switched from the main battery 28 to the auxiliary battery 29, and in addition, the emergency call signal is appropriately transmitted to the service center making it possible to perform a proper emergency call operation.

In the present embodiment, the in-vehicle emergency call apparatus is configured to have a stand-alone structure. Alternatively, the in-vehicle emergency call apparatus may be configured to be built in a vehicle as a module.

In the present embodiment, the airbag ECU provides the detection signal indicative of the occurrence of an emergency, which functions as a trigger for starting an emergency call operation. Alternatively, the detection signal indicative of the occurrence of an emergency may be input from a unit or an ECU other than the airbag ECU.

In the present embodiment, the inputting the airbag inflation signal three times in a row during the predetermined period provides a basis with the emergency notification detection unit 23 to determine whether the condition for transmitting the emergency call signal is satisfied. Alternatively, a condition other than the inputting the airbag inflation signal three times in a row during the predetermined period may provide a basis with the emergency notification detection unit 23 to determine whether the condition for transmitting the emergency call signal is satisfied.

While the invention has been described with reference to preferred embodiment thereof, it is to be understood that the invention is not limited to the preferred embodiment and construction. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An in-vehicle emergency call apparatus comprising:
   an emergency notification detection unit configured to
      determine whether a condition for transmitting an emergency call signal from a radio communication unit to a service center is satisfied within a predetermined period from a time when the emergency notification detection unit received a detection signal indicating the existence of an emergency situation, and
      output a power supply switch signal and an emergency notification detection signal when the condition for transmitting the emergency call signal is determined to be satisfied;
   a power supply switch unit configured to switch an operating power supply unit from a main battery to an auxiliary battery when the power supply switch signal is input from the emergency notification detection unit to the power supply switch unit;
   a control unit configured to cause the radio-communication unit to transmit the emergency call signal to the service center when the emergency notification detection signal is inputted from the emergency notification detection unit to the control unit and when an electric power condition that the electric power is supplied to the radio communication unit is satisfied;
   an electric power supply unit electrically connected with the main battery and the auxiliary battery via the power supply switch unit, and configured to supply the electric power to the emergency notification detection unit, the control unit and the radio-communication unit selectively from one of the main battery and the auxiliary battery;
   a first electric power supply line system including a first wiring that electrically connects the electric power supply unit to the emergency notification detection unit and the control unit, and that allows the electric power supply unit to supply the electric power to the emergency notification detection unit and the control unit selectively from the one of the main battery and the auxiliary battery; and
   a second electric power supply line system including a second wiring that is provided independently of the first wiring such that:
      the second wiring electrically connects the electric power supply unit to the radio communication unit; and
      the second wiring allows the electric power supply unit to supply the electric power to the radio communication unit selectively from the one of the main battery and the auxiliary battery.

2. The in-vehicle emergency call apparatus according to claim 1, wherein:
   the first electric power supply line system includes a first charging-discharging element; and
   the second electric power supply line system includes a second charging-discharging element the second electric power supply line system.

3. The in-vehicle emergency call apparatus according to claim 2, wherein:
   the first charging-discharging element includes a first capacitor that functions as a back-up capacitor for backing up the electric power supply to the emergency notification detection unit and the control unit, the first capacitor having a first capacitance; and
   the second charging-discharging element includes a second capacitor that functions as a back-up capacitor for backing up the electric power supply to the radio-communication unit having a second capacitance larger than the first capacitance.

4. The in-vehicle emergency call apparatus according to claim 1, wherein:
   the first electric power supply line system includes a first capacitor, the first electric power supply line system causing the electric power supply unit to supply the electric power to the emergency notification detection unit and the control unit from the first capacitor;
   the second electric power supply line system including a second capacitor, the second electric power supply line system causing the electric power supply unit to supply the electric power to the radio-communication unit from the second capacitor independently of the first electric power supply line system.

5. The in-vehicle emergency call apparatus according to claim 1, further comprising:
   a first charging-discharging element connected with the first wiring to backup supply of the electric power to the emergency notification detection unit and the control unit; and
   a second charging-discharging element connected with the second wiring to backup supply of the electric power to the radio communication unit; wherein:
   the first and second charging-discharging elements are configured such that when the electric power from the main battery is interrupted, the emergency notification detection unit and the control unit operate on the electric power originating from a stored voltage in the first charging-discharging element and the radio-communication unit operates on the electric power originating from a stored voltage in the second charging-discharging element until the electric power is supplied from the auxiliary battery to the emergency notification detection unit, the control unit, and the radio communication unit.

6. The in-vehicle emergency call apparatus according to claim 1, wherein the second electric power supply line system allows the electric power supply unit to supply the electric power to only the radio communication unit.

7. The in-vehicle emergency call apparatus according to claim 6, wherein the first electric power supply line system allows the electric power supply unit to supply the electric power to only the emergency notification detection unit and the control unit.

8. The in-vehicle emergency call apparatus according to claim 1, wherein the first and second electric power supply line systems are in communication with the main battery and the auxiliary battery through the electric power supply unit.

9. An in-vehicle emergency call apparatus coupled with an emergency notification electronic control unit (ECU) capable of outputting a detection signal, a radio-communication unit capable of transmitting an emergency call signal to a service center, and an operating power supply unit having a main battery and an auxiliary battery, the operating power supply unit capable of providing operating power for making the emergency call, the apparatus comprising:
 an emergency notification detection unit configured to
  determine whether a condition for transmitting the emergency call signal is satisfied within a predetermined period from a time when the detection signal is input to the emergency notification detection unit, and
  output a power supply switch signal and an emergency notification detection signal when the condition for transmitting the emergency call signal is determined to be satisfied;
 a power supply switch unit configured to switch the operating power supply unit from the main battery to the auxiliary battery when the power supply switch unit receives the power supply switch signal from the emergency notification detection unit;
 a control unit configured to cause the radio-communication unit to transmit the emergency call signal to the service center when the emergency notification detection signal is inputted from the emergency notification detection unit to the control unit and when an electric power condition that electric power is supplied to the radio communication unit is satisfied;
 an electric power supply unit configured to supply electric power to the emergency notification detection unit, the control unit and the radio-communication unit selectively from one of the main battery and the auxiliary battery;
 a first electric power supply line system that causes the electric power supply unit to supply the electric power to the emergency notification detection unit and the control unit;
 a second electric power supply line system that causes the electric power supply unit to supply the electric power to the radio-communication unit, the second electric power supply line system being provided independently of the first electric power supply line system;
 a first charging-discharging element that is coupled with the first electric power supply line system; and
 a second charging-discharging element that is coupled with the second electric power supply line system.

10. The in-vehicle emergency call apparatus according to claim 9, wherein:
 the first power supply line system is a first wiring that electrically connects the electric power supply unit to the emergency notification detection unit and the control unit, and that allows the electric power supply unit to supply the electric power to the emergency notification detection unit and the control unit;
 the second power supply line system is a second wiring that is provided independently of the first wiring such that the second wiring electrically connects the electric power supply unit supply to the radio communication unit, and the second wiring allows the electric power supply unit to supply the electric power to the radio communication unit; and
 the first and second charging-discharging elements are configured such that when the electric power from the main battery is interrupted, the emergency notification detection unit and the control unit operate on the electric power originating from a stored voltage in the first charging-discharging element and the radio-communication unit operates on the electric power originating from a stored voltage in the second charging-discharging element until the electric power is supplied from the auxiliary battery to the emergency notification detection unit, the control unit, and the radio communication unit.

11. The in-vehicle emergency call apparatus according to claim 9, wherein the second electric power supply line system allows the electric power supply unit to supply the electric power to only the radio communication unit.

12. The in-vehicle emergency call apparatus according to claim 11, wherein the first electric power supply line system allows the electric power supply unit to supply the electric power to only the emergency notification detection unit and the control unit.

13. The in-vehicle emergency call apparatus according to claim 9, wherein the first and second electric power supply line systems are in communication with the main battery and the auxiliary battery through the electric power supply unit.

14. An in-vehicle emergency call apparatus comprising:
 an emergency notification detection unit configured to
  determine whether a condition for transmitting an emergency call signal from a radio communication unit to a service center is satisfied within a predetermined period from a time when a detection signal indicating the existence of an emergency situation is received, and
  output a power supply switch signal and an emergency notification detection signal when the condition for transmitting the emergency call signal is determined to be satisfied;
 an electric power supply unit configured to supply electric power to the emergency notification detection unit and the radio-communication unit selectively from one of a main battery and an auxiliary battery;
 a control unit supplied electric power by the electric power supply unit selectively from the one of the main battery and the auxiliary battery, the control unit configured to cause the radio-communication unit to transmit the emergency call signal to the service center when the emergency notification detection signal is received and when an electric power condition that the electric power is supplied from the electric power supply unit to the radio-communication unit selectively from the one is satisfied;
 a power supply switch unit configured to switch the operating power supply unit from the main battery to the auxiliary battery when the power supply switch signal is input to the power supply switch unit;
 a first electric power supply line system electrically connecting the electric power supply unit to the emergency notification detection unit and the control unit, the first electric power supply line system supplying the electric power to the emergency notification detection unit and the control unit; and a second electric power supply line system provided independently of the first electric power supply line system electrically connecting the electric power supply unit to the radio-communication unit, the second electric power supply line system supplying the electric power to the radio-communication unit independently of the first electric power supply line system.

15. The in-vehicle emergency call apparatus according to claim 14, wherein:
the first electric power supply line system includes a first charging-discharging element; and
the second electric power supply line system includes a second charging-discharging element the second electric power supply line system.

16. The in-vehicle emergency call apparatus according to claim 15, wherein:
the first charging-discharging element includes a first capacitor that functions as a back-up capacitor for backing up the electric power supply to the emergency notification detection unit and the control unit, the first capacitor having a first capacitance; and
the second charging-discharging element includes a second capacitor that functions as a back-up capacitor for backing up the electric power supply to the radio-communication unit having a second capacitance larger than the first capacitance.

17. The in-vehicle emergency call apparatus according to claim 14, wherein:
the first electric power supply line system includes a first capacitor, the first electric power supply line system supplying the electric power to the emergency notification detection unit and the control unit from the first capacitor;
the second electric power supply line system including a second capacitor, the second electric power supply line system supplying the electric power to the radio-communication unit from the second capacitor independently of the first electric power supply line system.

18. The in-vehicle emergency call apparatus according to claim 14, wherein the second electric power supply line system supplies the electric power to only the radio communication unit.

19. The in-vehicle emergency call apparatus according to claim 18, wherein the first electric power supply line system supplies the electric power to only the emergency notification detection unit and the control unit.

20. The in-vehicle emergency call apparatus according to claim 14, wherein the first and second electric power supply line systems are in communication with the main battery and the auxiliary battery through the electric power supply unit.

* * * * *